(12) United States Patent
Liu

(10) Patent No.: US 11,374,283 B2
(45) Date of Patent: Jun. 28, 2022

(54) ELECTRONIC CIGARETTE

(71) Applicant: Tuanfang Liu, Shenzhen (CN)

(72) Inventor: Tuanfang Liu, Shenzhen (CN)

( * ) Notice: Subject to any disclaimer, the term of this patent is extended or adjusted under 35 U.S.C. 154(b) by 484 days.

(21) Appl. No.: 16/581,717

(22) Filed: Sep. 24, 2019

(65) Prior Publication Data

US 2020/0315263 A1 Oct. 8, 2020

(30) Foreign Application Priority Data

Apr. 2, 2019 (CN) .......................... 201910262676.0
Apr. 2, 2019 (CN) .......................... 201920441672.4

(51) Int. Cl.
*H01M 50/24* (2021.01)
*F16J 15/02* (2006.01)
*H05B 3/54* (2006.01)
*H01M 50/20* (2021.01)

(52) U.S. Cl.
CPC ........... *H01M 50/24* (2021.01); *F16J 15/022* (2013.01); *H01M 50/20* (2021.01); *H05B 3/54* (2013.01); *H01M 2220/30* (2013.01)

(58) Field of Classification Search
CPC ..... H01M 50/24; H01M 50/20; H01M 220/30
USPC ........................................................ 131/329
See application file for complete search history.

(56) References Cited

U.S. PATENT DOCUMENTS

| | | | | |
|---|---|---|---|---|
| 9,801,418 B1 * | 10/2017 | Liu | ............................. | A24F 7/00 |
| 9,867,399 B1 * | 1/2018 | Liu | ........................... | A24F 40/42 |
| 9,961,942 B2 * | 5/2018 | Liu | ........................... | A24F 40/40 |
| 9,986,769 B1 * | 6/2018 | Liu | ........................... | A24F 40/40 |
| 11,089,820 B2 * | 8/2021 | Liu | ........................... | A24F 40/40 |
| 2014/0130797 A1 * | 5/2014 | Liu | ........................... | A24F 40/46 |
| | | | | 128/202.21 |
| 2014/0182610 A1 * | 7/2014 | Liu | ........................... | A24F 40/42 |
| | | | | 131/329 |
| 2015/0272210 A1 * | 10/2015 | Liu | ........................... | A24F 13/12 |
| | | | | 131/257 |
| 2016/0135501 A1 * | 5/2016 | Liu | ........................... | F22B 1/284 |
| | | | | 392/404 |
| 2017/0042228 A1 * | 2/2017 | Liu | ........................... | A24F 40/50 |
| 2017/0231280 A1 * | 8/2017 | Anton | ..................... | A24F 40/65 |
| | | | | 392/404 |
| 2017/0311646 A1 * | 11/2017 | Liu | ........................... | A24F 40/40 |
| 2017/0354182 A1 * | 12/2017 | Liu | ........................... | A24F 40/40 |
| 2018/0153220 A1 * | 6/2018 | Verleur | ................... | A24F 40/70 |

(Continued)

*Primary Examiner* — Alexander Gilman
(74) *Attorney, Agent, or Firm* — Matthias Scholl P.C.; Matthias Scholl

(57) ABSTRACT

An electronic cigarette including an atomization assembly and a battery assembly. The atomization assembly includes an atomization core; a mouthpiece; a first cover disposed on the mouthpiece; a first rubber ring; a spinning ring; a first fixed ring fixing the spinning ring; a silicone ring; a connector; a second rubber ring; an e-liquid tank; a second seal ring sealing the e-liquid tank; a silicone gasket; a second cover covering the e-liquid tank; a press part; a connection cylinder; a fourth seal ring and a fifth seal ring sealing two ends of the connection cylinder, respectively; a positive terminal; a positive silicone; and a second fixed ring fixing the connection cylinder. The atomization core includes a spring; a first seal ring; a heating wire; a limit cover limiting the heating wire; a first fixed seat fixing the heating wire; a third seal ring sealing the first fixed seat.

1 Claim, 5 Drawing Sheets

(56) References Cited

U.S. PATENT DOCUMENTS

| | | | |
|---|---|---|---|
| 2018/0310627 A1* | 11/2018 | Qiu | A24F 7/00 |
| 2018/0325177 A1* | 11/2018 | Chen | A24F 40/485 |
| 2019/0053544 A1* | 2/2019 | Yamada | A24F 40/42 |
| 2019/0133190 A1* | 5/2019 | Chen | A24F 40/40 |
| 2019/0289911 A1* | 9/2019 | Liu | A24F 7/00 |
| 2019/0289913 A1* | 9/2019 | Liu | A61M 11/042 |
| 2019/0350256 A1* | 11/2019 | Hejazi | A24F 40/485 |
| 2019/0357595 A1* | 11/2019 | Liu | F16J 15/324 |
| 2020/0093184 A1* | 3/2020 | Crespo | A24F 7/02 |
| 2020/0113241 A1* | 4/2020 | Liu | A24F 40/40 |
| 2020/0138110 A1* | 5/2020 | Liu | A61M 15/06 |
| 2020/0178613 A1* | 6/2020 | Liu | F16J 15/022 |
| 2020/0214359 A1* | 7/2020 | Liu | H01M 50/213 |
| 2020/0297036 A1* | 9/2020 | Liu | A24F 40/42 |
| 2020/0315263 A1* | 10/2020 | Liu | F16J 15/022 |
| 2021/0401054 A1* | 12/2021 | Janfada | A24F 40/46 |
| 2022/0001119 A1* | 1/2022 | Woods | A24F 40/42 |
| 2022/0015419 A1* | 1/2022 | Liu | H05B 45/20 |
| 2022/0022553 A1* | 1/2022 | Uhrmeister | G05B 15/02 |
| 2022/0071285 A1* | 3/2022 | Lord | A24F 40/44 |

* cited by examiner

ELECTRONIC CIGARETTE

CROSS-REFERENCE TO RELATED APPLICATIONS

Pursuant to 35 U.S.C. § 119 and the Paris Convention Treaty, this application claims foreign priority to Chinese Patent Application No. 201910262676.0 filed Apr. 2, 2019, and to Chinese Patent Application No. 201920441672.4 filed Apr. 2, 2019. The contents of all of the aforementioned applications, including any intervening amendments thereto, are incorporated herein by reference.

BACKGROUND

The disclosure relates to an electronic cigarette.

Electronic cigarettes atomize nicotine-containing e-liquid.

Conventionally, the atomization assembly of electronic cigarettes includes no structures to prevent accidental disassembly. This results in unwanted leakage of the e-liquid.

In addition, conventionally, the atomization assembly is fixedly attached to the battery assembly resulting in difficult replacement or repair of individual parts.

SUMMARY

The disclosure provides an electronic cigarette.

The electronic cigarette comprises an atomization assembly and a battery assembly. The atomization assembly is disposed on the battery assembly.

The atomization assembly comprises an atomization core; a mouthpiece; a first cover disposed on the mouthpiece; a first rubber ring; a spinning ring; a first fixed ring fixing the spinning ring; a silicone ring; a connector; a second rubber ring; an e-liquid tank; a second seal ring sealing the e-liquid tank; a silicone gasket; a second cover covering the e-liquid tank; a press part; a connection cylinder; a fourth seal ring and a fifth seal ring sealing two ends of the connection cylinder, respectively; a positive terminal; a positive silicone; and a second fixed ring fixing the connection cylinder. The atomization core comprises a spring; a first seal ring; a heating wire; a limit cover limiting the heating wire; a first fixed seat fixing the heating wire; a third seal ring sealing the first fixed seat; a first cotton embedded in the heating wire; a second cotton sheathed on the heating wire; a first fixed part fixing the limit cover; a joint directly connected to the heating wire; an insulation ring.

The battery assembly comprises a housing; a fixed support fixing the housing; a silicone gasket disposed on the fixed support; a sixth seal ring; a press button; a second fixed part; a plastic part; a regulating ring; a second fixed seat fixing the regulating ring; a seventh seal ring sealing the regulating ring; a needle tube; a control plate; a pneumatic switch; a sleeve sheathed on the pneumatic switch; a third cover covering the control plate; a battery core; a plastic gasket; an elastic needle; and a support supporting the control plate.

The second rubber ring and the silicone gasket are disposed on the second cover; the second cover is disposed on the e-liquid tank; the press part is embedded in the connection cylinder; the fourth seal ring is disposed on the positive terminal; the positive silicone is sheathed on the positive terminal; the positive terminal and the positive silicone are disposed in the connection cylinder; the fifth seal ring and the second seal ring are disposed on two ends of the connection cylinder, respectively; the connection cylinder is disposed in the e-liquid tank; the second fixed ring is disposed at a bottom of the e-liquid tank; the first cotton and the second cotton are disposed inside and outside the heating wire, respectively; the heating wire is fixed on the first fixed seat; the third seal ring is disposed on the first fixed seat; the insulation ring is disposed in the first fixed seat; the insulation ring is sheathed on the joint; the insulation ring and the joint are disposed in the first fixed part; and the first fixed part is disposed in the limit cover; the first seal ring is disposed on the limit cover; the spring is embedded in the limit cover; the first rubber ring, the spinning ring, and the silicone ring are sequentially disposed on the connector in that order; the first fixed ring fixes the spinning ring on the connector; the atomization core is in threaded connection to the connector; the connector is in threaded connection to the connection cylinder; the mouthpiece is disposed on the second cover; and the first cover is disposed on the mouthpiece.

The support comprises a top hole and the elastic needle is disposed in the top hole; positive and negative electrodes of the battery core and the pneumatic switch are disposed on the control plate; the plastic gasket is attached to the battery core; the plastic gasket and the battery core are disposed on the support; the needle tube is disposed on the sleeve and communicates with the pneumatic switch; the pneumatic switch and the sleeve are disposed in the plastic part; the second fixed seat and the seventh seal ring are sequentially disposed on the plastic part; the regulating ring and the sixth seal ring are disposed on the plastic part; the plastic part is disposed on the third cover; the third cover is disposed on the support; the housing comprises a groove and the press button is disposed in the groove; the support is disposed in the housing; the silicone gasket is disposed in the second fixed part; the second fixed part is disposed on the third cover; the fixed support is disposed in the housing; and the regulating ring comprises a plurality of air inlets and is disposed on one side of the housing.

Advantages of the electronic cigarette according to embodiments of the disclosure are summarized as follows. The first rubber ring, the spinning ring, and the silicone ring are sequentially disposed on the connector in that order. The first fixed ring fixes the spinning ring on the connector. The atomization core is in threaded connection to the connector. The atomization core cannot be pulled out unless simultaneously pressing and rotating the spinning ring, thus preventing the disassembly of the atomization core by children by accident. The regulating ring comprises a plurality of air inlets and is disposed on one side of the housing. Rolling the regulating ring can control the flow rate of the vapor.

DETAILED DESCRIPTION

Figure 1:
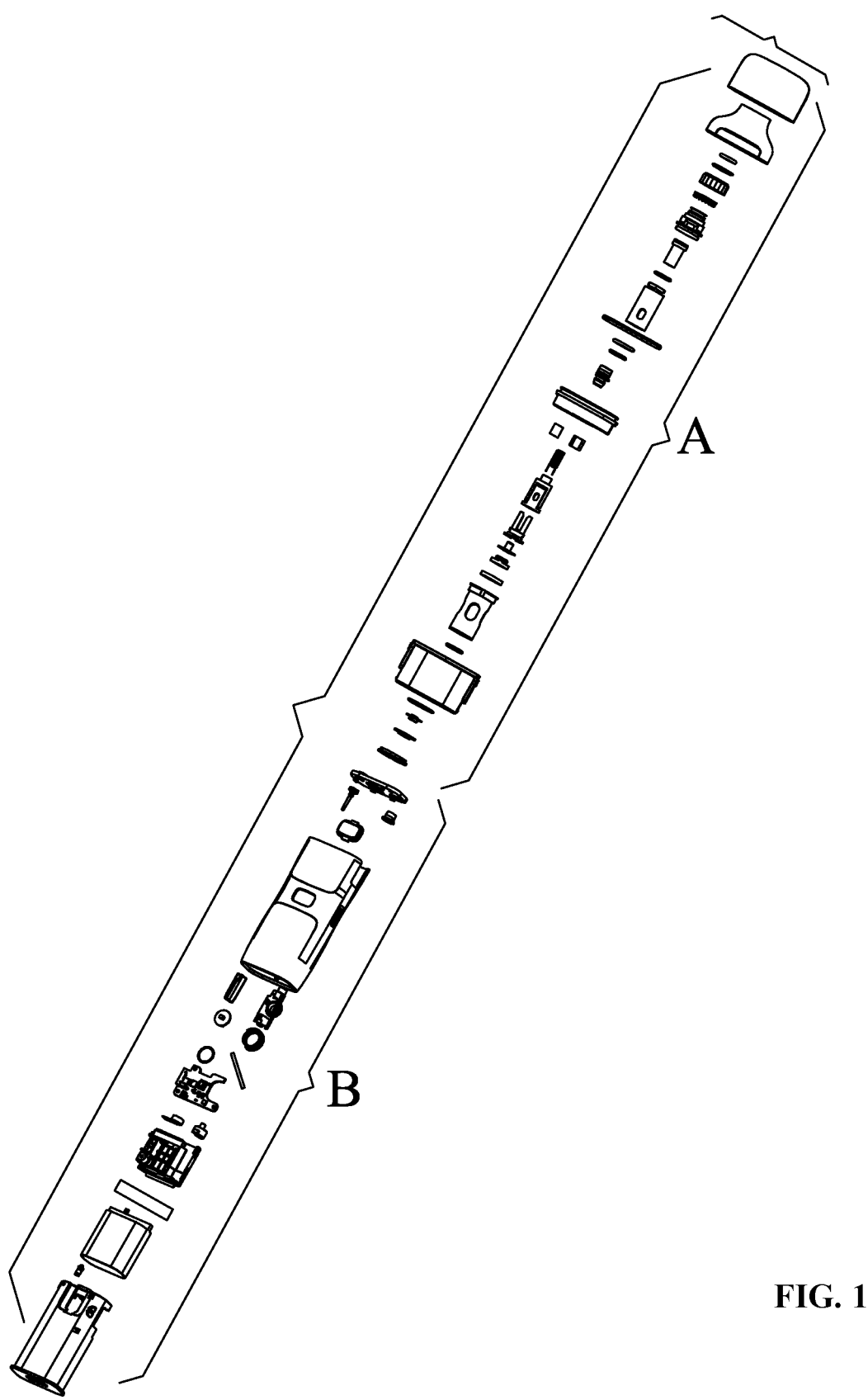
FIG. 1 is an exploded view of an electronic cigarette according to one embodiment of the disclosure.
Figure 2:
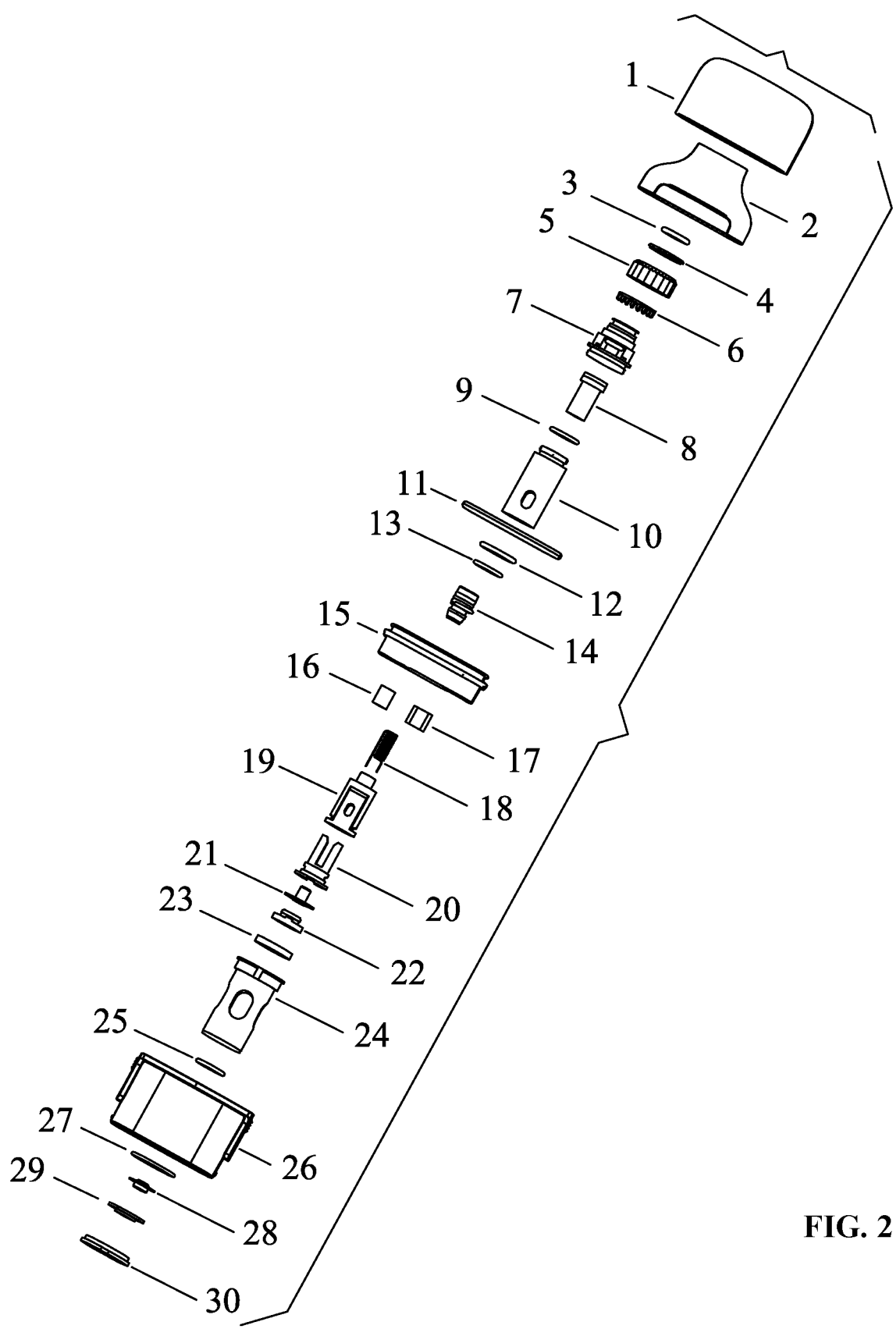
FIG. 2 is an exploded view of an atomization assembly of an electronic cigarette according to one embodiment of the disclosure.
Figure 3:
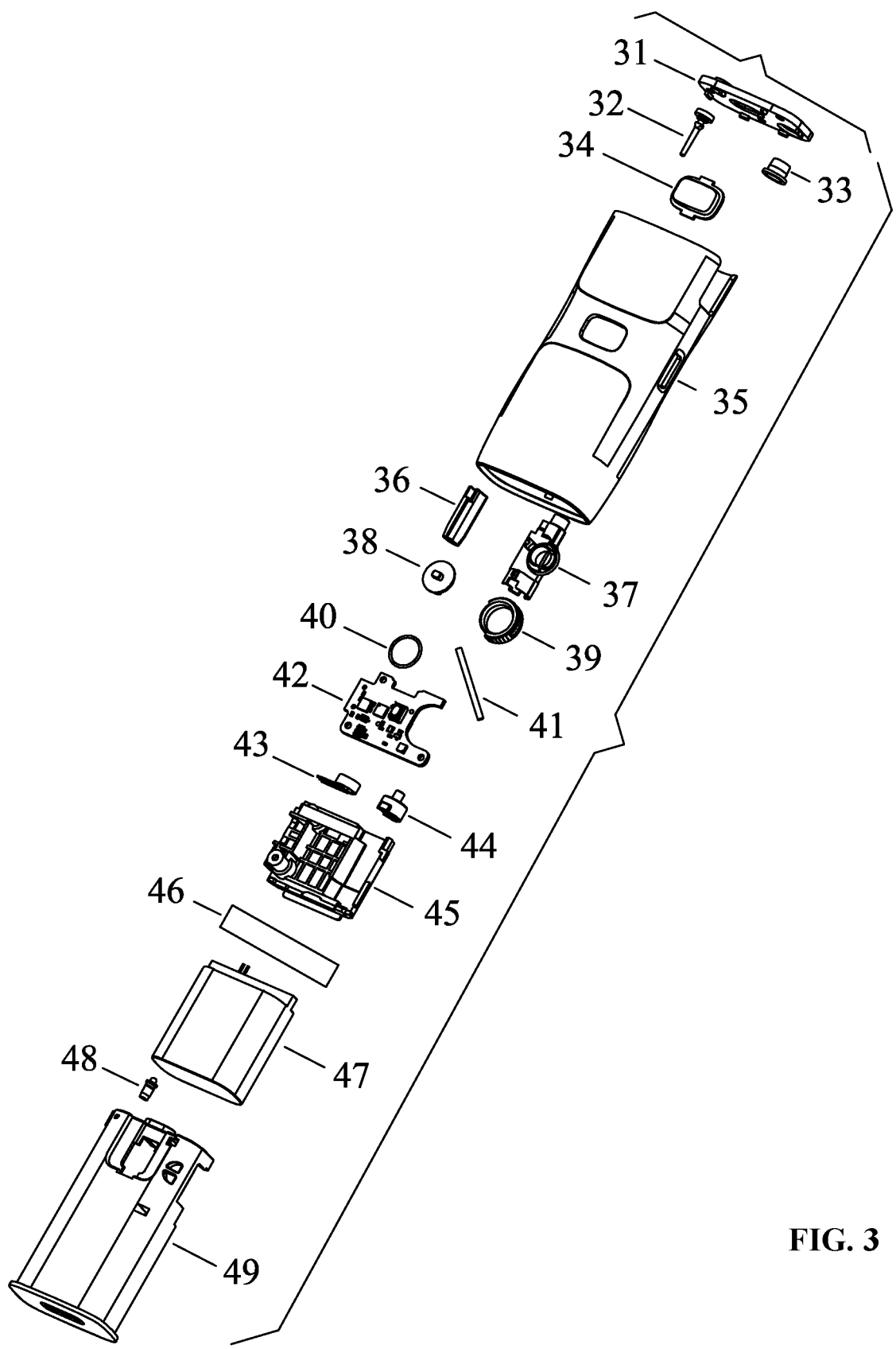
FIG. 3 is an exploded view of a battery assembly of an electronic cigarette according to one embodiment of the disclosure.
Figure 4:
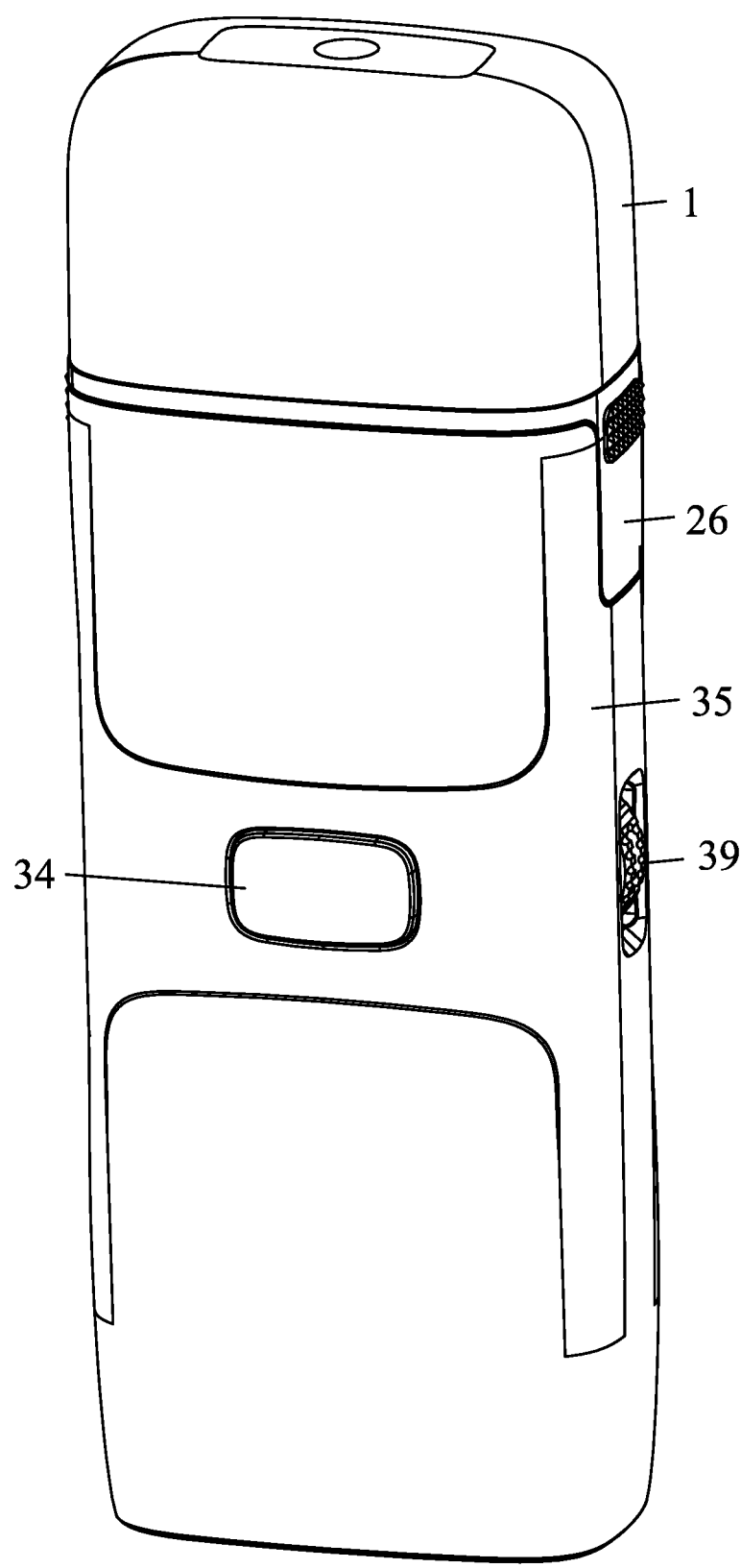
FIG. 4 is a schematic diagram of an electronic cigarette according to one embodiment of the disclosure.
Figure 5:
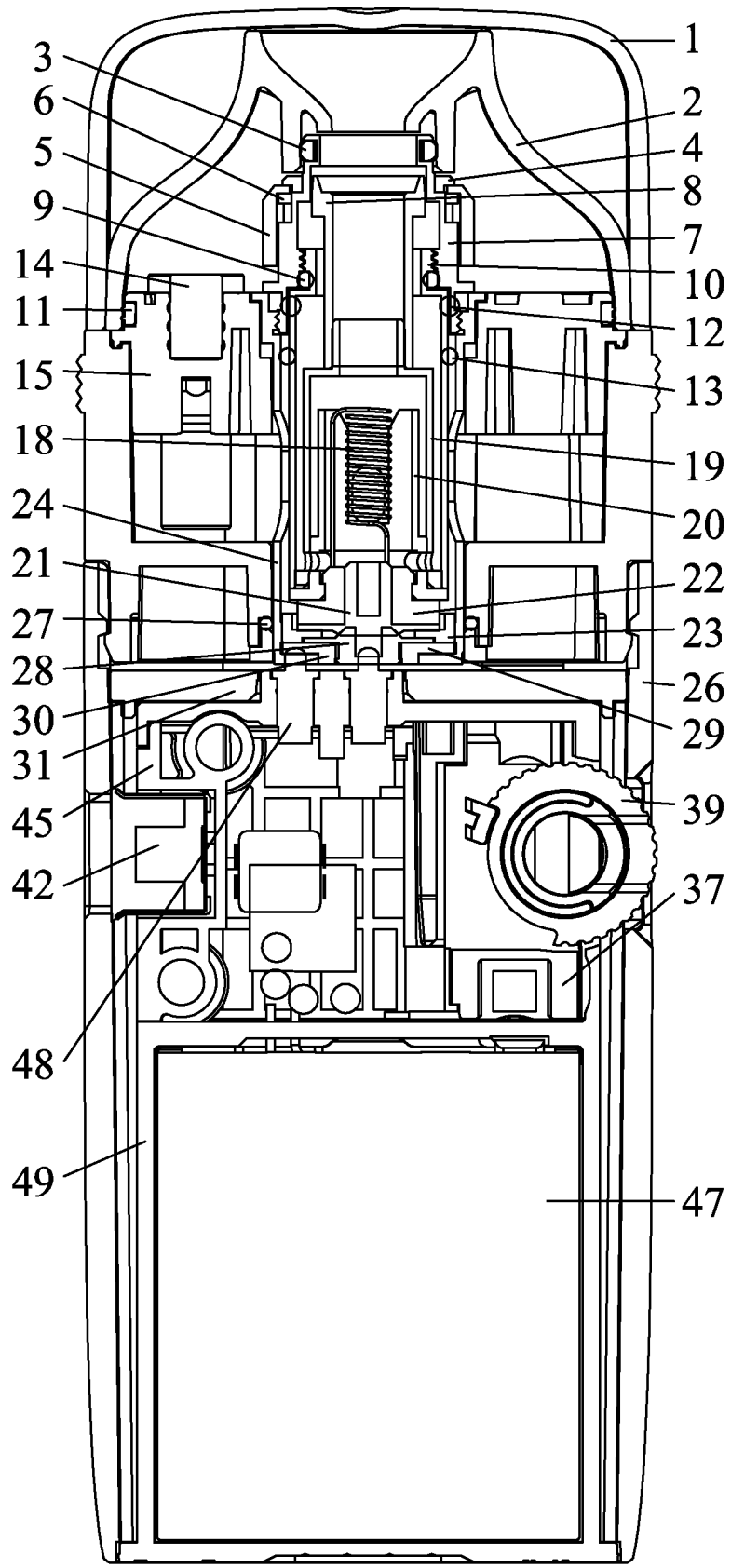
FIG. 5 is a sectional view of an electronic cigarette according to one embodiment of the disclosure.

To further illustrate, embodiments detailing an electronic cigarette are described below. It should be noted that the following embodiments are intended to describe and not to limit the disclosure.

An electronic cigarette comprises an atomization assembly A and a battery assembly B. The atomization assembly A is disposed in the battery assembly B.

The atomization assembly A comprises an atomization core; a mouthpiece 2; a first cover 1 disposed on the mouthpiece 2; a first rubber ring 3; a spinning ring 5; a first fixed ring 4 fixing the spinning ring 5; a silicone ring 6; a connector 7; a second rubber ring 11; an e-liquid tank 26; a second seal ring 12 sealing the e-liquid tank 26; a silicone gasket 14; a second cover 15 covering the e-liquid tank 26; a press part 23; a connection cylinder 24; a fourth seal ring 25 and a fifth seal ring 27 sealing two ends of the connection cylinder 24, respectively; a positive terminal 28; a positive silicone 29; and a second fixed ring 30 fixing the connection cylinder 24. The atomization core comprises a spring 8; a first seal ring 9; a heating wire 18; a limit cover 10 limiting the heating wire 18; a first fixed seat 20 fixing the heating wire 18; a third seal ring 13 sealing the first fixed seat 20; a first cotton 16 embedded in the heating wire; a second cotton 17 sheathed on the heating wire; a first fixed part 19 fixing the limit cover 10; a joint 21 directly connected to the heating wire; an insulation ring 22.

The battery assembly comprises a housing 35; a fixed support 31 fixing the housing 35; a silicone gasket 32 disposed on the fixed support 31; a sixth seal ring 33; a press button 34; a second fixed part 36; a plastic part 37; a regulating ring 39; a second fixed seat 38 fixing the regulating ring 39; a seventh seal ring 40 sealing the regulating ring 39; a needle tube 41; a control plate 42; a pneumatic switch 43; a sleeve 44 sheathed on the pneumatic switch 43; a third cover 45 covering the control plate 42; a battery core 47; a plastic gasket 46; an elastic needle 48; and a support 49 supporting the control plate 42.

The second rubber ring 11 and the silicone gasket 14 are disposed on the second cover 15; the second cover 15 is disposed on the e-liquid tank 26; the press part 23 is embedded in the connection cylinder 24; the fourth seal ring 25 is disposed on the positive terminal 28; the positive silicone 29 is sheathed on the positive terminal 28; the positive terminal 28 and the positive silicone 29 are disposed in the connection cylinder 24; the fifth seal ring 27 and the second seal ring 12 are disposed on two ends of the connection cylinder 24, respectively; the connection cylinder 24 is disposed in the e-liquid tank 26; the second fixed ring 30 is disposed at a bottom of the e-liquid tank 26; the first cotton 16 and the second cotton 17 are disposed inside and outside the heating wire 18, respectively; the heating wire 18 is fixed on the first fixed seat 20; the third seal ring 13 is disposed on the first fixed seat 20; the insulation ring 22 is disposed in the first fixed seat 20; the insulation ring 22 is sheathed on the joint 21; the insulation ring 22 and the joint 21 are disposed in the first fixed part 19; and the first fixed part 19 is disposed in the limit cover 10; the first seal ring 9 is disposed on the limit cover 10; the spring 8 is embedded in the limit cover 10; the first rubber ring 3, the spinning ring 5, and the silicone ring 6 are sequentially disposed on the connector 7 in that order; the first fixed ring 4 fixes the spinning ring 5 on the connector 7; the atomization core is in threaded connection to the connector 7; the connector 7 is in threaded connection to the connection cylinder 24; the mouthpiece is disposed on the second cover 15; and the first cover 1 is disposed on the mouthpiece 2.

The support 49 comprises a top hole and the elastic needle 48 is disposed in the top hole; positive and negative electrodes of the battery core 47 and the pneumatic switch 43 are disposed on the control plate 42; the plastic gasket 46 is attached to the battery core 47; the plastic gasket 46 and the battery core 47 are disposed on the support 49; the needle tube 41 is disposed on the sleeve 44 and communicates with the pneumatic switch 43; the pneumatic switch 43 and the sleeve 44 are disposed in the plastic part 37; the second fixed seat 38 and the seventh seal ring 40 are sequentially disposed on the plastic part 37; the regulating ring 39 and the sixth seal ring 33 are disposed on the plastic part 37; the plastic part 37 is disposed on the third cover 45; the third cover 45 is disposed on the support 49; the housing 35 comprises a groove and the press button 34 is disposed in the groove; the support 49 is disposed in the housing 35; the silicone gasket 32 is disposed in the second fixed part 36; the second fixed part 36 is disposed on the third cover 45; the fixed support 31 is disposed in the housing 35; and the regulating ring 39 comprises a plurality of air inlets and is disposed on one side of the housing 35.

The first rubber ring 3, the spinning ring 5, and the silicone ring 6 are sequentially disposed on the connector 7 in that order; the first fixed ring 4 fixes the spinning ring 5 on the connector 7; the atomization core is in threaded connection to the connector 7. The atomization core cannot be pulled out unless simultaneously pressing and rotating the spinning ring 5, thus preventing the disassembly of the atomization core by children by accident. The regulating ring 39 comprises a plurality of air inlets and is disposed on one side of the housing 35. Rolling the regulating ring 39 can control the flow rate of the vapor.

It will be obvious to those skilled in the art that changes and modifications may be made, and therefore, the aim in the appended claims is to cover all such changes and modifications.

What is claimed is:

1. A device, comprising:
    1) an atomization assembly, the atomization assembly comprising:
        an atomization core, comprising a spring; a first seal ring; a heating wire; a limit cover limiting the heating wire; a third seal ring sealing the first fixed seat; a first cotton embedded in the heating wire; a second cotton sheathed on the heating wire; a first fixed part fixing the limit cover; a first fixed seat fixing the heating wire; a joint directly connected to the heating wire; an insulation ring;
        a mouthpiece;
        a first cover disposed on the mouthpiece;
        a first rubber ring;
        a spinning ring;
        a first fixed ring fixing the spinning ring;
        a silicone ring;
        a connector;
        a second rubber ring;
        an e-liquid tank;
        a second seal ring sealing the e-liquid tank;
        a silicone gasket;
        a second cover covering the e-liquid tank;
        a press part;
        a connection cylinder;
        a fourth seal ring and a fifth seal ring sealing two ends of the connection cylinder, respectively;
        a positive terminal connected to the atomization core;

a positive silicone; and
a second fixed ring fixing the connection cylinder;
2) a battery assembly, the battery assembly comprising:
a housing;
a fixed support fixing the housing;
a silicone gasket disposed on the fixed support;
a sixth seal ring;
a press button;
a second fixed part;
a plastic part;
a regulating ring;
a second fixed seat fixing the regulating ring;
a seventh seal ring sealing the regulating ring;
a needle tube;
a control plate;
a pneumatic switch;
a sleeve sheathed on the pneumatic switch;
a third cover covering the control plate;
a battery core;
a plastic gasket;
an elastic needle; and
a support supporting the control plate;
wherein:
the second rubber ring and the silicone gasket are disposed on the second cover; the second cover is disposed on the e-liquid tank; the press part is embedded in the connection cylinder; the fourth seal ring is disposed on the positive terminal; the positive silicone is sheathed on the positive terminal; the positive terminal and the positive silicone are disposed in the connection cylinder; the fifth seal ring and the second seal ring are disposed on two ends of the connection cylinder, respectively; the connection cylinder is disposed in the e-liquid tank; the second fixed ring is disposed at a bottom of the e-liquid tank;
the first cotton and the second cotton are disposed inside and outside the heating wire, respectively; the heating wire is fixed on the first fixed seat; the third seal ring is disposed on the first fixed seat; the insulation ring is disposed in the first fixed seat; the insulation ring is sheathed on the joint; the insulation ring and the joint are disposed in the first fixed part; and the first fixed part is disposed in the limit cover; the first seal ring is disposed on the limit cover; the spring is embedded in the limit cover;
the first rubber ring, the spinning ring, and the silicone ring are sequentially disposed on the connector in that order; the first fixed ring fixes the spinning ring on the connector; the atomization core is in threaded connection to the connector; the connector is in threaded connection to the connection cylinder; the mouthpiece is disposed on the second cover; and the first cover is disposed on the mouthpiece;
the support comprises a top hole and the elastic needle is disposed in the top hole; positive and negative electrodes of the battery core and the pneumatic switch are disposed on the control plate; the plastic gasket is attached to the battery core; the plastic gasket and the battery core are disposed on the support;
the needle tube is disposed on the sleeve and communicates with the pneumatic switch; the pneumatic switch and the sleeve are disposed in the plastic part; the second fixed seat and the seventh seal ring are sequentially disposed on the plastic part; the regulating ring and the sixth seal ring are disposed on the plastic part; the plastic part is disposed on the third cover; the third cover is disposed on the support; the housing comprises a groove and the press button is disposed in the groove;
the support is disposed in the housing; the silicone gasket is disposed in the second fixed part; the second fixed part is disposed on the third cover; the fixed support is disposed in the housing; and
the regulating ring comprises a plurality of air inlets and is disposed on one side of the housing.

* * * * *